(12) United States Patent
Lin et al.

(10) Patent No.: US 10,990,136 B2
(45) Date of Patent: Apr. 27, 2021

(54) WIRELESS COMMUNICATION DEVICE AND CASE ASSEMBLY

(71) Applicant: HTC CORPORATION, Taoyuan (TW)

(72) Inventors: Cheng Hung Lin, Taoyuan (TW); Szu Po Wang, Taoyuan (TW); Chun Hsien Lee, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 0 days.

(21) Appl. No.: 16/537,984

(22) Filed: Aug. 12, 2019

(65) Prior Publication Data

US 2021/0048843 A1 Feb. 18, 2021

(51) Int. Cl.

| | |
|---|---|
| *G06F 1/16* | (2006.01) |
| *H04B 1/3888* | (2015.01) |
| *H01Q 1/12* | (2006.01) |
| *H01Q 21/06* | (2006.01) |
| *H01Q 1/24* | (2006.01) |
| *H04B 7/0413* | (2017.01) |
| *H04B 7/06* | (2006.01) |

(52) U.S. Cl.
CPC ............ *G06F 1/166* (2013.01); *G06F 1/1626* (2013.01); *H01Q 1/125* (2013.01); *H01Q 21/065* (2013.01); *H04B 1/3888* (2013.01); *H01Q 1/242* (2013.01); *H04B 7/0413* (2013.01); *H04B 7/0617* (2013.01)

(58) Field of Classification Search
CPC ....... G06F 1/166; G06F 1/1626; H01Q 1/125; H01Q 21/065; H04B 1/3888
See application file for complete search history.

(56) References Cited

U.S. PATENT DOCUMENTS

| | | | |
|---|---|---|---|
| 6,341,227 B1 * | 1/2002 | Moster ................. | H04B 1/3833 455/550.1 |
| 2013/0286623 A1 * | 10/2013 | Slipy ..................... | F16M 11/10 361/807 |
| 2019/0393598 A1 * | 12/2019 | Logothetis ............... | H01Q 3/08 |

* cited by examiner

*Primary Examiner* — James Wu
*Assistant Examiner* — Hung Q Dang
(74) *Attorney, Agent, or Firm* — Cantor Colburn LLP (57) ABSTRACT

A wireless communication device and a case assembly are provided. The wireless communication device includes main body, kickstand structure and antenna module. The main body includes display portion, back portion and RF signal module. The display and back portions are opposite, which the RF signal module is disposed between. The kickstand structure is rotationally pivoted to the back portion of main body. The antenna module is disposed on the kickstand structure and electrically connected to the RF signal module of main body. The case assembly is partially covered the wireless communication device and includes case covering the back portion of wireless communication device, kickstand structure rotationally pivoted to the case and antenna module disposed on the kickstand structure and electrically connecting to the RF signal module of wireless communication device. Thus, rotation of kickstand structure can change orientation of antenna module to transmit and receive wireless signals, so as to improve wireless signal transmission.

5 Claims, 7 Drawing Sheets

WIRELESS COMMUNICATION DEVICE AND CASE ASSEMBLY

BACKGROUND OF THE INVENTION

Field of the Invention

The present invention relates to a wireless communication device and a case assembly covering the same, and more particularly, relates to a wireless communication device having an adjustable orientation of the antenna for transmitting and receiving wireless signals and a case assembly covering the same.

Descriptions of the Related Art

With the vigorous development of the wireless communication industry, people's demands for wireless data transmission are increasing day by day. In order to meet the demands of users, a fast wireless transmission speed is necessary. Therefore, the fifth generation of mobile communication system (5G) provided with a higher bandwidth and a lower transmission delay has been mainly developed by current wireless communication devices.

Frequency bands currently used by the 5G mobile communication system generally include two categories, namely, a frequency band not greater than 6 Hz and a frequency band not less than 24 GHz, and the frequency band not less than 24 GHz is also called a millimeter Wave (mmWave) frequency band. As compared to the frequency band of a lower frequency, the mmWave frequency band has an advantage of rapid transmitting signals, but it also has a disadvantage of large attenuation of signals during transmission thereof due to poor diffraction capability. In order to improve the problem of signal attenuation, the transmission of millimeter waves requires antenna technologies such as massive multi-input multi-output (MIMO) and beam forming or the like. However, beam forming imparts high directivity to the transmission of the millimeter waves, and the wireless communication fails once mmWave beams cannot be transmitted/received by the antenna in a specific direction.

Therefore, it is insufficient for the wireless communication device to have only one antenna for transceiving millimeter waves, and instead, multiple antennas are required in order to cover multiple transmitting/receiving orientations. However, in order to provide enough space for the accommodation and operation of the multiple antennas, the size (e.g., width) of the wireless communication device may need to be increased or the size of other elements in the wireless communication device may need to be decreased (e.g., the size of the battery may need to be decreased, which results in the reduction of the electricity capacity). Moreover, even if the wireless communication device is provided with multiple antennas, it may be hard to receive the signal of a base station, and thus the user needs to change the orientation of the wireless communication device.

According to the above descriptions, the wireless communication device and method may be improved at least in the above aspects.

SUMMARY OF THE INVENTION

An objective of the present invention is to provide a wireless communication device and a case assembly covering the same, which can improve the signal strength by only adjusting the orientation of the antenna module to transmit and receive (transceive) wireless signals, without changing the orientation of the wireless communication device significantly.

To achieve the aforesaid objective, the wireless communication device provided by the present invention comprises a main body, a kickstand structure and an antenna module. The main body includes a display portion, a back portion and a radio frequency (RF) signal module. The display portion is opposite to the back portion. The RF signal module is disposed between the display portion and the back portion. The kickstand structure is rotationally pivoted to the back portion of the main body. The antenna module is disposed on the kickstand structure and electrically connected to the RF signal module of the main body.

The case assembly provided by the present invention can partially cover the wireless communication device, and the case assembly comprises a case, a kickstand structure and an antenna module. The case is configured to cover a back portion of the wireless communication device. The kickstand structure is rotationally pivoted to the case. The antenna module is disposed on the kickstand structure and electrically connected to the RF signal module of the wireless communication device.

In an embodiment, the kickstand structure included in the wireless communication device and the case assembly of the present invention comprises a first plate body, and the first plate body is rotationally pivoted to the back portion, and the antenna module comprises at least one first antenna array which is disposed on the first plate body.

In an embodiment, the first plate body included in the wireless communication device and the case assembly of the present invention comprises a connecting component, and the first plate body is connected to the back portion by the connecting component which is a hinge or a ball joint.

In an embodiment, the kickstand structure included in the wireless communication device and the case assembly of the present invention comprises a second plate body, and the second plate body is rotationally pivoted to the first plate body, and the antenna module comprises at least one second antenna array which is disposed on the second plate body.

In an embodiment, the second plate body included in the wireless communication device and the case assembly of the present invention comprises a connecting component, and the second plate body is connected to the first plate body by the connecting component which is a hinge or a ball joint.

In an embodiment, the back portion included in the wireless communication device and the case included in the case assembly comprise a recess, and the kickstand structure is received in the recess.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following description, specific embodiments of the present invention will be described specifically. However, the present invention may be implemented by embodiments of various forms without departing from the spirit of the present invention, and the scope claimed in the present invention shall not be interpreted as being limited to what described in the specification.

As used herein, the singular forms "a" and "an" are intended to include the plural forms as well, unless the context clearly indicates otherwise. Furthermore, terms "first" and "second" are used herein to describe various elements or components instead of indicating the sequence or priority of these elements or components. Moreover, orientations described herein (e.g., front, back, upper, lower, two sides, inside, outside or the like) are relative orientations that may be defined depending on the usage status of a wireless communication device, and are not intended to indicate or imply that the wireless communication device needs to have constructions or operations in particular orientations, and the present invention shall not be interpreted as being limited by these orientations.

The wireless communication device of the invention can be an electronics such as mobile phone, tablet, notebook, network sharing device or hub, which can carry out wireless communication. The technical content of various components will be illustrated below by taking the mobile phone as an example without being limited thereto. In addition, the wireless communication device may be a device that is capable of transceiving millimeter waves and suitable for the 5G mobile communication system.

Figure 1:
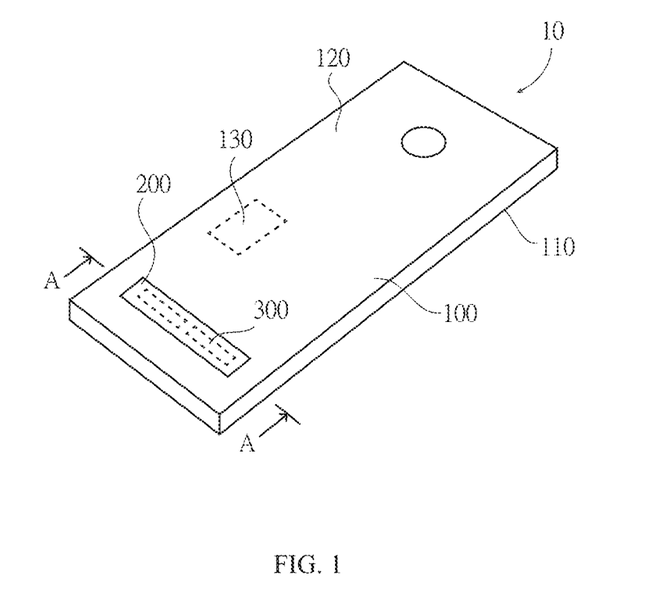
FIG. 1 is a perspective view of a wireless communication device according to the first preferred embodiment of the present invention (the kickstand structure is in a folded state)

Please refer to FIG. 1, which is a perspective view of a wireless communication device 10 according to the first preferred embodiment of the present invention. The wireless communication device 10 may comprise a main body 100, a kickstand structure 200 and an antenna module 300.

The main body 100 comprises a display portion 110, a back portion 120 and a radio frequency (RF) signal module 130. The display portion 110 may comprise the display screen and the bezel thereof. The back portion 120 is opposite to the display portion 110 which may comprise the back cover of the mobile phone. There is a receiving space between the display portion 110 and the back portion 120, so as to accommodate other components, such as microprocessor, battery, circuit board, electronic components or the like. The RF signal module (or called RF control module) 130 is disposed between the display portion 110 and the back portion 120, and can be electrically connected to other components such as processors or the like in the main body 100. The RF signal module 130 is mainly used to process the RF signals transceived by the undermentioned antenna module 300, such as the conversion of RF signals to digital signals, power amplification and the like. The RF signal module 130 may comprise one or more chips, and also comprise an impedance matching circuit, and can be integrated into a chip with other functionally related electronic components. The RF signal module 130, for example, can be commercially available chips such as Snapdragon X50 from Qualcomm Please refer to FIG. 2 together, which is a cross-sectional view of the wireless communication device 10 taken along line A-A (in order to be clearly presented, each component is drawn to an exaggerated scale, and the relative size and position of each element are not limited thereto). The kickstand structure 200 is rotationally pivoted to the back portion 120 of the main body 100, and the material of the kickstand structure 200 can be plastic or metal, etc. The kickstand structure 200 can be rotated to stack on the back portion 120 or rotated to a specific angle and fixed.

Figure 2:
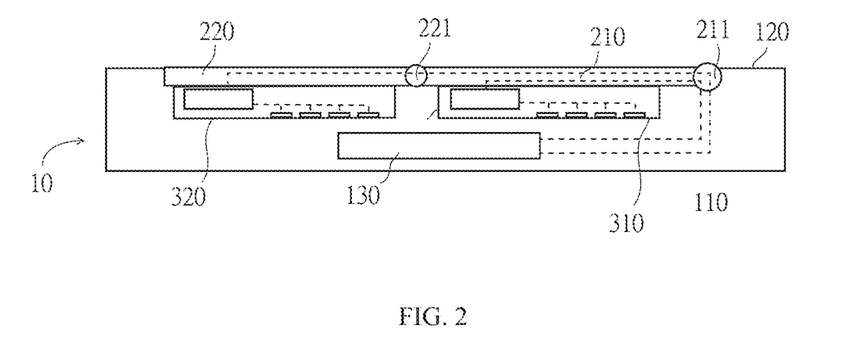
FIG. 2 is a cross-sectional view of the wireless communication device shown in FIG. 1 taken along line A-A.

More specifically, the kickstand structure 200 may include a first plate body 210 and a second plate body 220. The first plate body 210 may include a connecting component 211 which is pivoted to the back portion 120. The connecting component 211 is preferably a hinge or a ball joint, so the first plate body 210 can rotate in two or three dimensional manner relative to the back portion 120. The second plate body 220 may also include a connecting component 221 which is pivoted to the first plate body 210. The connecting component 221 is preferably a hinge or a ball joint, so the second plate body 220 can rotate in two or three dimensional manner relative to the first plate body 210. Alternatively, the first plate body 210 or the second plate body 220 can be provided with holes or hooks (not shown) for the user to hang with a rope.

Figure 3:
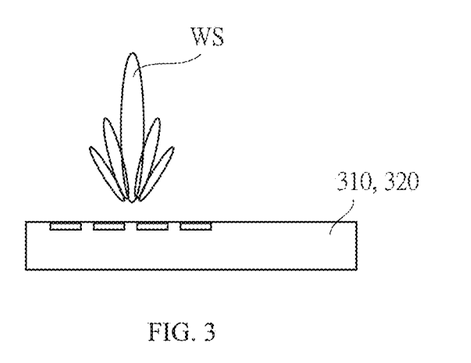
FIG. 3 is a schematic view of the antenna module of the wireless communication device shown in FIG. 1.

The antenna module 300 is disposed on the kickstand structure 200 and electrically connected to the RF signal module 130 (e.g. via a flexible wire, cable or circuit board to connect to each other) to transmit the received RF signal to the RF signal module 130 or emit out the RF signal from the RF signal module 130 inversely. The antenna module 300 includes at least one first antenna array 310 and at least one second antenna array 320. The first antenna array 310 is disposed on the first plate body 210, and the second antenna array 320 is disposed on the second plate body 220 (including embedded or implanted in the first plate body 210 or the second plate body 220). In this embodiment, the antenna arrays 310/320 are capable of transceiving millimeter-wave (mmWave) and include a plurality of antenna units. The antenna units are arranged on a circuit board in one or two dimensional directions. In addition, the antenna arrays 310/320 have functions of beamforming that can concentrate millimeter-wave in a specific direction to increase antenna gain. Moreover, according to the antenna arrays 310/320 and the beam pattern schematic view thereof shown in FIG. 3, the antenna arrays 310/320 can dynamically adjust the focusing direction of the wireless signal (millimeter wave) WS (i.e. beam tracking) to match the direction of the wireless signal transmitted by the base stations (not shown), thereby obtaining better quality of wireless transmission. For example, the focused wireless signal WS may be perpendicular to the surface of the antenna array 310 (320), or inclined at 30 or 60 degrees.

Figure 4:
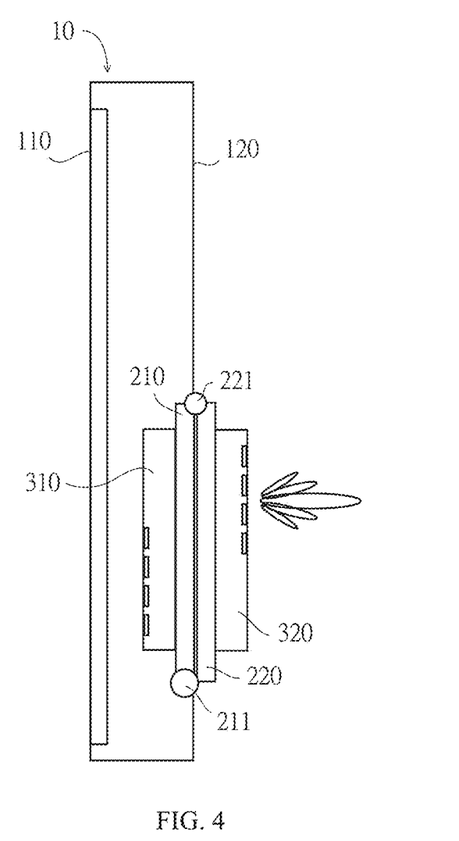
FIGS. 4 to 7 are other schematic views of the wireless communication device shown in FIG. 1 respectively (the kickstand structures are in different unfolded states)
Figure 5:
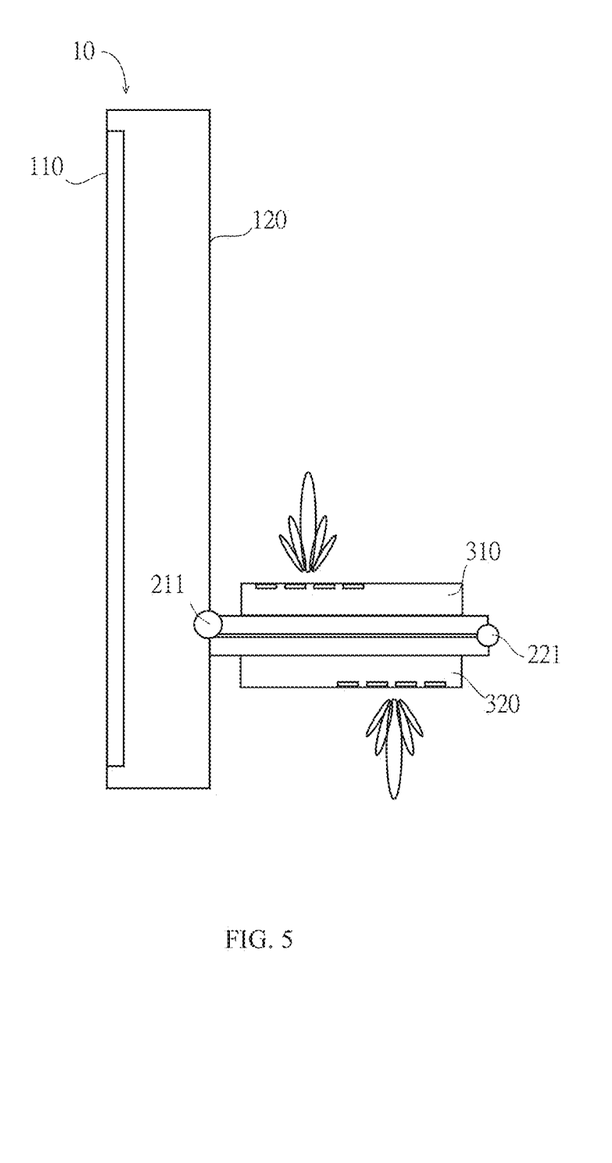
Figure 6:
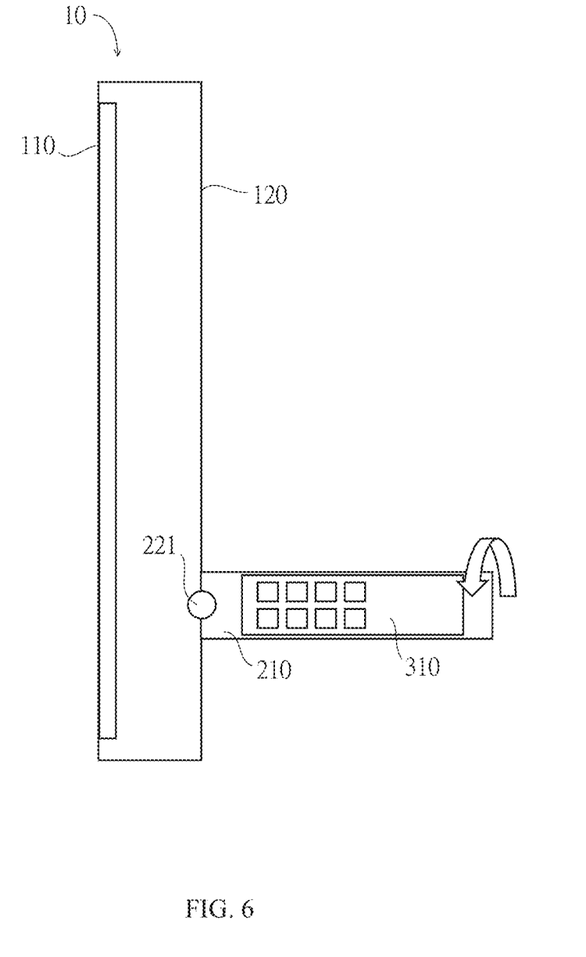
Figure 7:
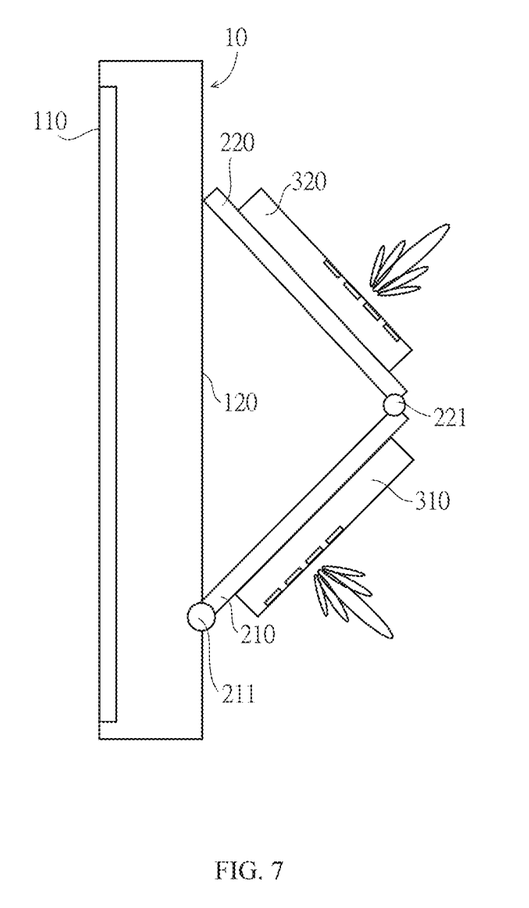

When the first plate body 210 and the second plate body 220 of the kickstand structure 200 are rotated, the antenna arrays 310/320 will be rotated together and moved significantly to transceive the wireless signal WS in different directions. Specifically, please refer to FIG. 4, when the antenna array 310 face forwards (i.e. toward the display portion 310) and cannot effectively transceive the wireless signals, the user can rotate and stack the second plate body 220 on the first plate body 210, so that the second plate body 320 can transceive wireless signals from rear. Alternatively, as shown in FIG. 5 to FIG. 6, the user can erect the stacked first plate body 210 and second plate body 220 relative to the back portion 120, so that the antenna arrays 310/320 can transceive signals from up and down or left and right respectively. Alternatively, as shown in FIG. 7, the first plate body 210 and the second plate body 220 are unfolded from the back portion 120 but not stack with each other, so that the antenna arrays 310/320 can transceive signals from rear-up and rear-down respectively. Thus, the user can rotate and move the antenna array 310/320 in any direction to get a better position to receive signals without moving the whole main body 100 of the wireless communication device 10.

In addition, the microprocessor of the wireless communication device 10 can help the user to move the antenna arrays 310/320 better; that is said, the microprocessor can run an application to determine whether the strength of the wireless signal transceived currently by the antenna arrays 310/320 is enough. When the strength is determined insufficient, hint or instruction can be provided through the display portion 110 to the user to move or rotate the antenna arrays 310/320. Then, whether the beam is of best angle can be determined according to the information of the connected wireless signals. The beam of the antenna module 300 is then optimized to maintain the beam at the optimal angle.

Figure 8:
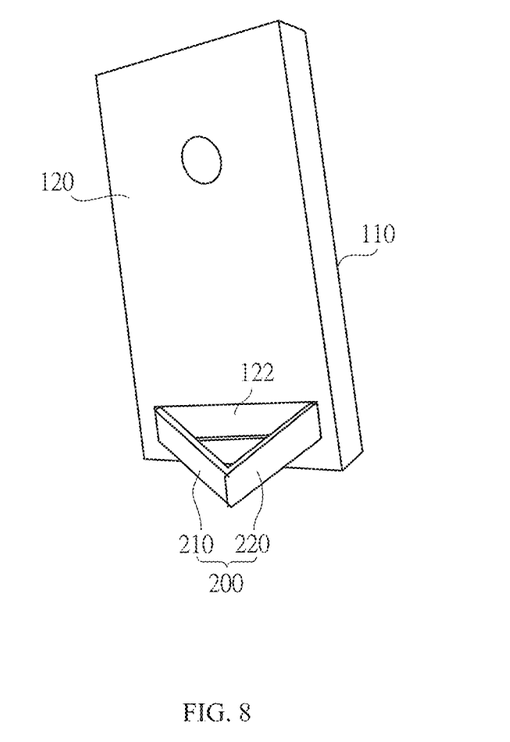
FIG. 8 is another perspective schematic view of the wireless communication device according to the first preferred embodiment of the present invention (the kickstand structure is in an unfolded state)

Please refer to FIG. 8, the first plate body 210 and the second plate body 220 can function as a kickstand when they are unfolded from the back portion 120, and thus the main body 100 of the wireless communication device 10 can be obliquely disposed on a flat surface (such as a desktop). In addition, the back portion 120 of the main body 100 may further include a recess 122, so that the kickstand structure 200 can be received in the recess 122 to maintain the smooth appearance of the wireless communication device 10.

Except for the implementation that the kickstand structure 200 includes the pivoted first and second plate bodies 210/220, the kickstand structure 200 can be implemented as only including the first plate body 210 (not shown), or the first plate body 210 and the second plate body 220 pivoted to the back portion 120 individually (not shown). The effects of adjusting the direction of the antenna arrays 310/320 to transceive signals and supporting the main body 100 can be achieved.

Figure 9:
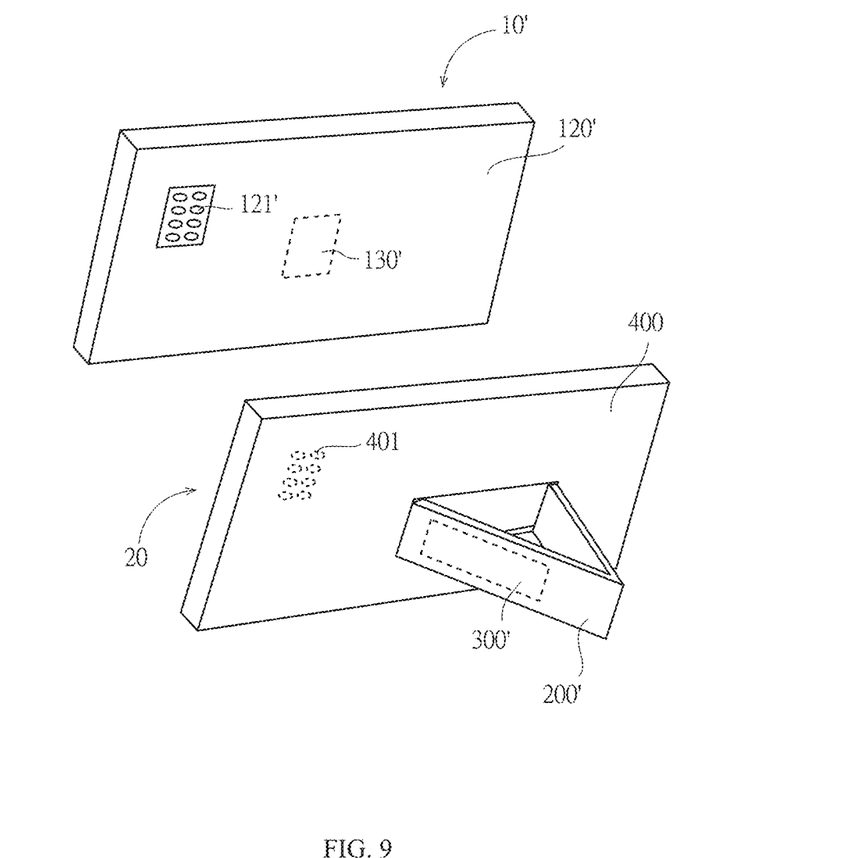
FIG. 9 is a perspective schematic view of a case assembly according to the second preferred embodiment of the present invention (the kickstand structure is in an unfolding state).

Please refer to FIG. 9, which is a perspective view of a case assembly 20 according to the second preferred embodiment of the present invention. The case assembly 20 can partially cover a wireless communication device 10', and include a case 400, kickstand structure 200' and an antenna module 300'. The case 400 is configured to cover the back portion 120' of the wireless communication device 10', such as the protective case for the mobile phone or tablet. The technical contents of the kickstand structure 200' and the antenna module 300' can be referred to the kickstand structure 200 and antenna module 300 in the above embodiment. The case 400 includes an electrical connector 401 (e.g. a plurality of metal contacts) which is electrically connected to the antenna module 300'. Correspondingly, the wireless communication device 10' also includes an electrical connector 121' disposed on the back portion 120' and electrically connected to the RF signal module 130' in the wireless communication device 10'.

When the case 400 covers the back portion 120', the electrical connector 401 can touch the electrical connector 121' to electrically connect the antenna module 300' with the RF signal module 130' of the wireless communication device 10'. Thus, the wireless communication device 10' can transceive wireless signals through the antenna module 300'.

According to the above descriptions, the wireless communication device and the case assembly of the present invention have a kickstand structure and an antenna module that are capable of arbitrarily adjusting the direction of signal transceiving, thereby eliminating the trouble that the antenna module occupies the internal space of the wireless communication device, and may achieve better signal transmission effect with fewer antenna modules, and have support function to enhance convenience.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A wireless communication device, comprising:
 a main body, comprising a display portion, a back portion and a RF signal module, wherein the display portion is opposite to the back portion, and the RF signal module is disposed between the display portion and the back portion;
 a kickstand structure including a first plate body and a second plate body, wherein the first plate body is rotationally pivoted to the back portion, and the second plate body is rotationally pivoted to the first plate body, thereby the second plate body is configured to rotate and stack on the first plate body, and the kickstand structure is configured to rotate and stack on the back portion; and
 an antenna module, disposed on the kickstand structure, and electrically connected to the RF signal module of the main body, and capable of transceiving millimeter-wave,
 wherein the second plate body comprises a connecting component, the second plate body is pivoted to the first plate body by the connecting component which is a ball joint, so that the second plate body can be rotated in any direction relative to the first plate body.

2. The wireless communication device according to claim 1, wherein the antenna module comprises at least one first antenna array which is disposed on the first plate body.

3. The wireless communication device according to claim 1, wherein the first plate body comprises a connecting component, the first plate body is pivoted to the back portion by the connecting component which is a hinge or a ball joint.

4. The wireless communication device according to claim 1, wherein the antenna module comprises at least one second antenna array which is disposed on the second plate body.

5. The wireless communication device according to claim 1, wherein the back portion comprises a recess, and the kickstand structure is received in the recess.

* * * * *